United States Patent Office 3,583,973
Patented June 8, 1971

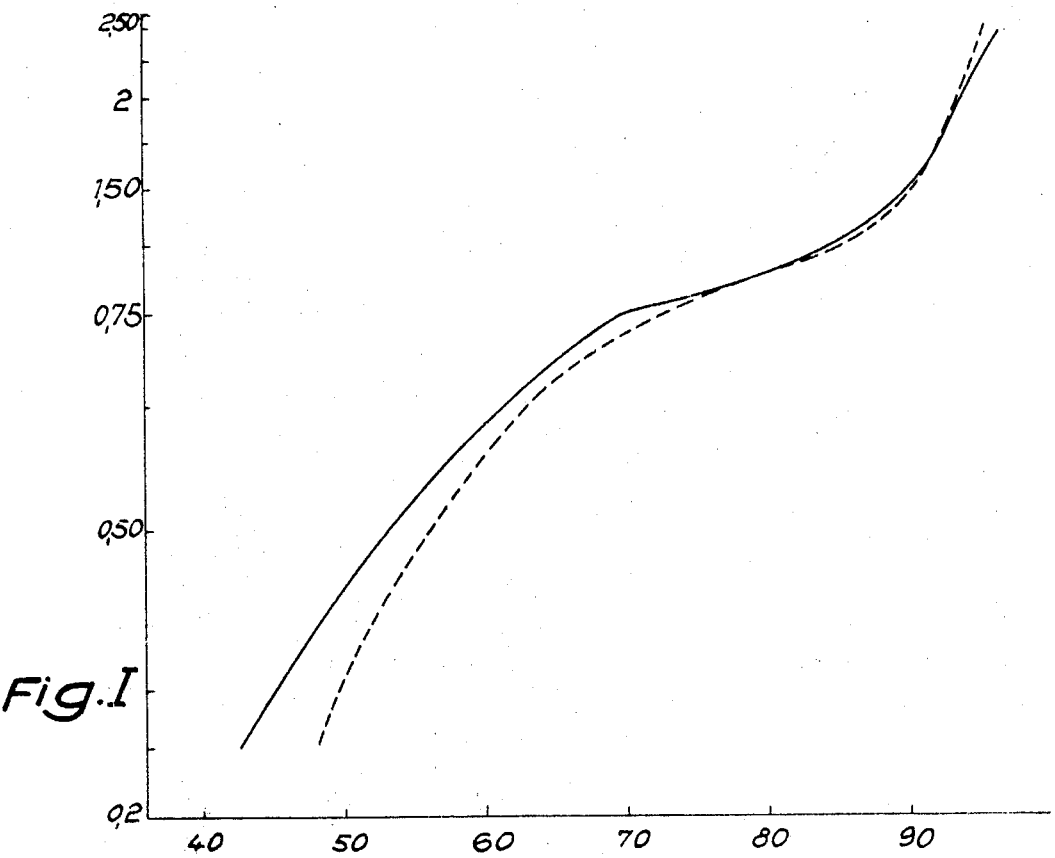
Fig. I
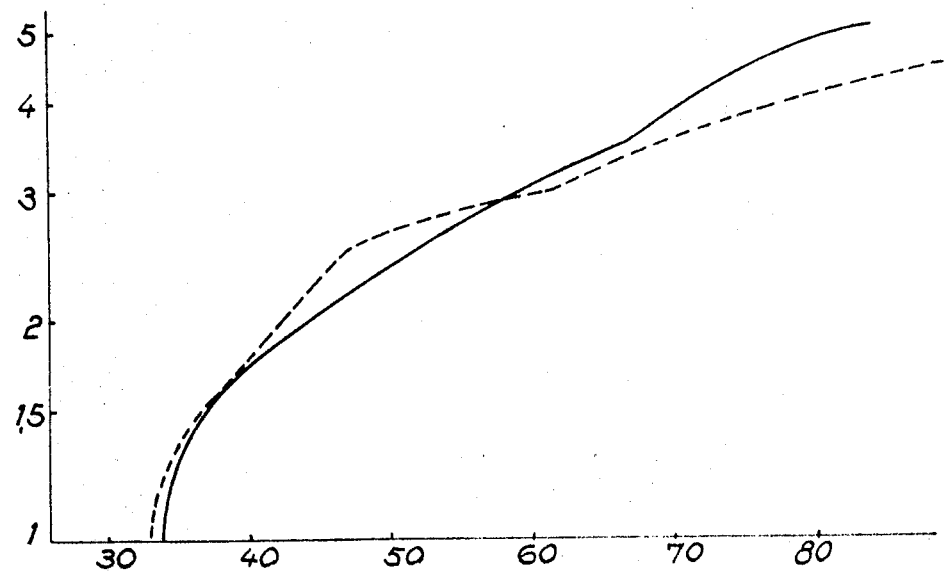
Fig. III

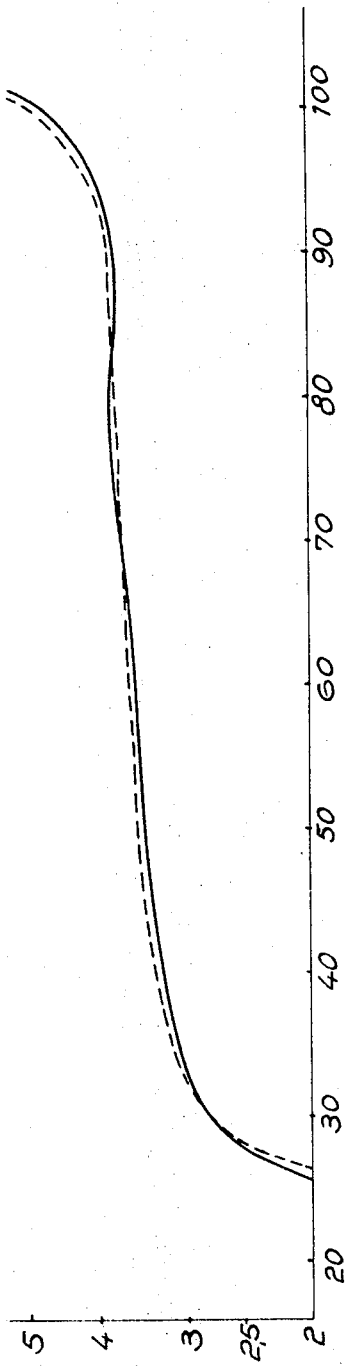
Fig. II
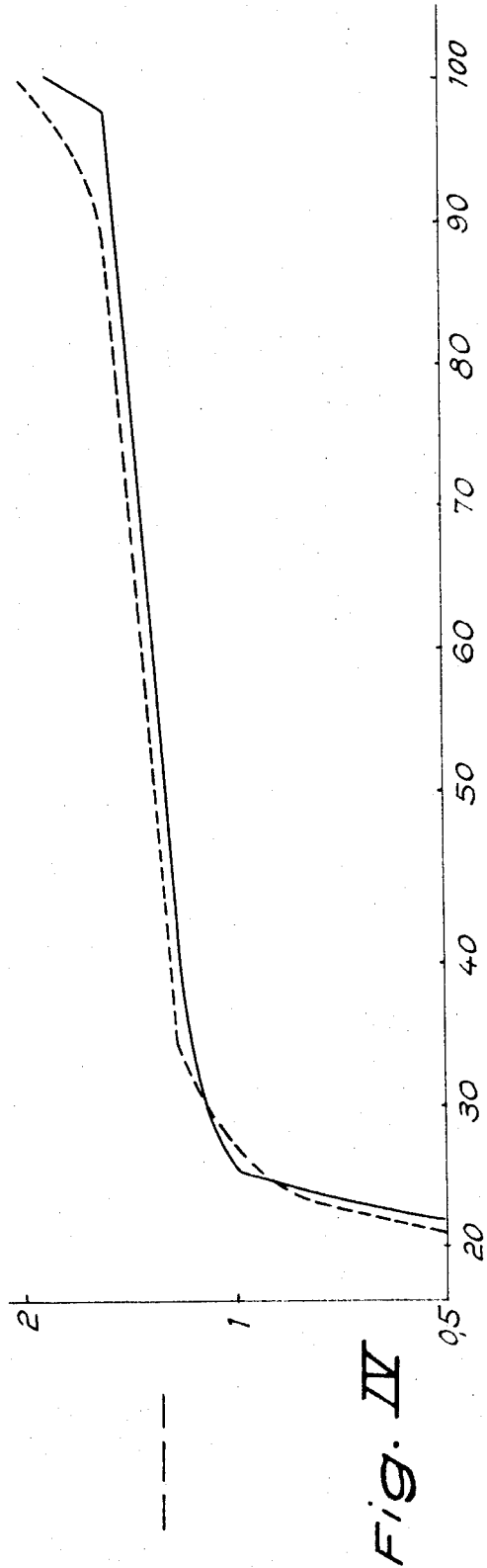
Fig. IV

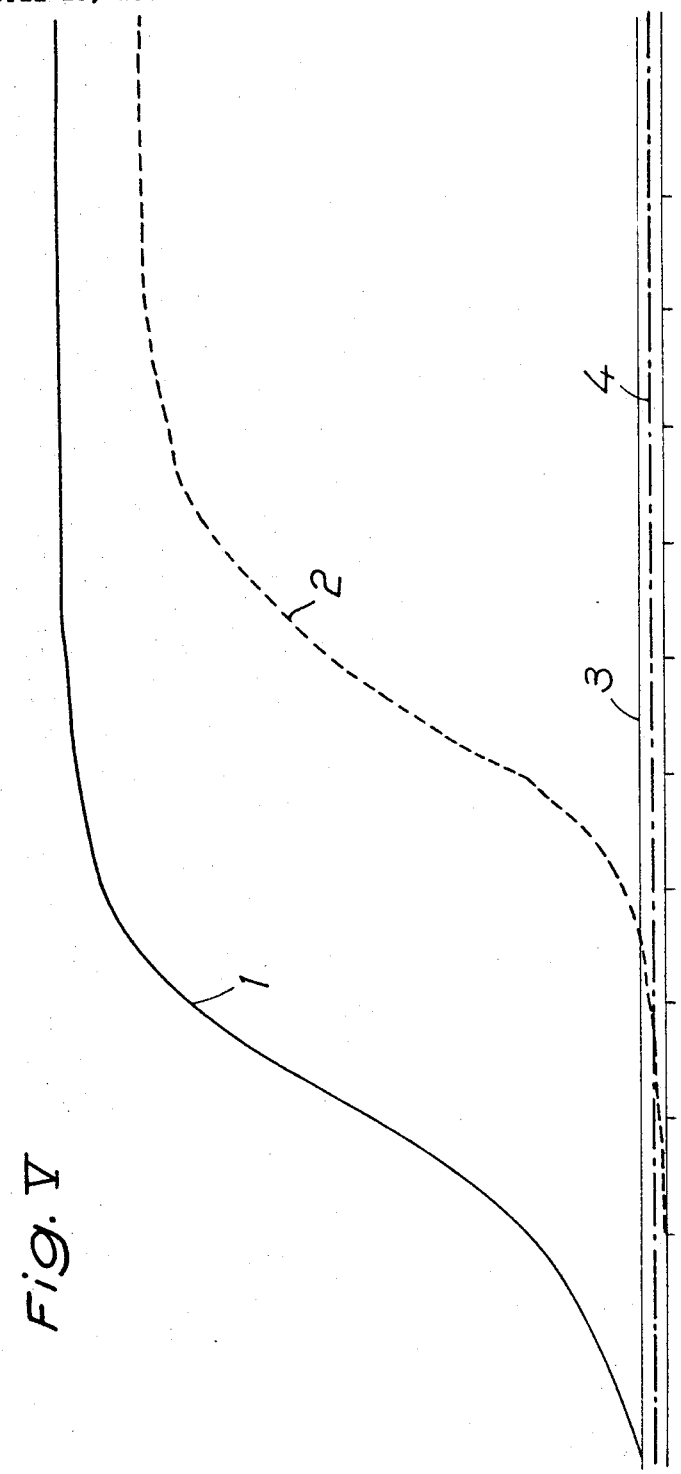
Fig. V

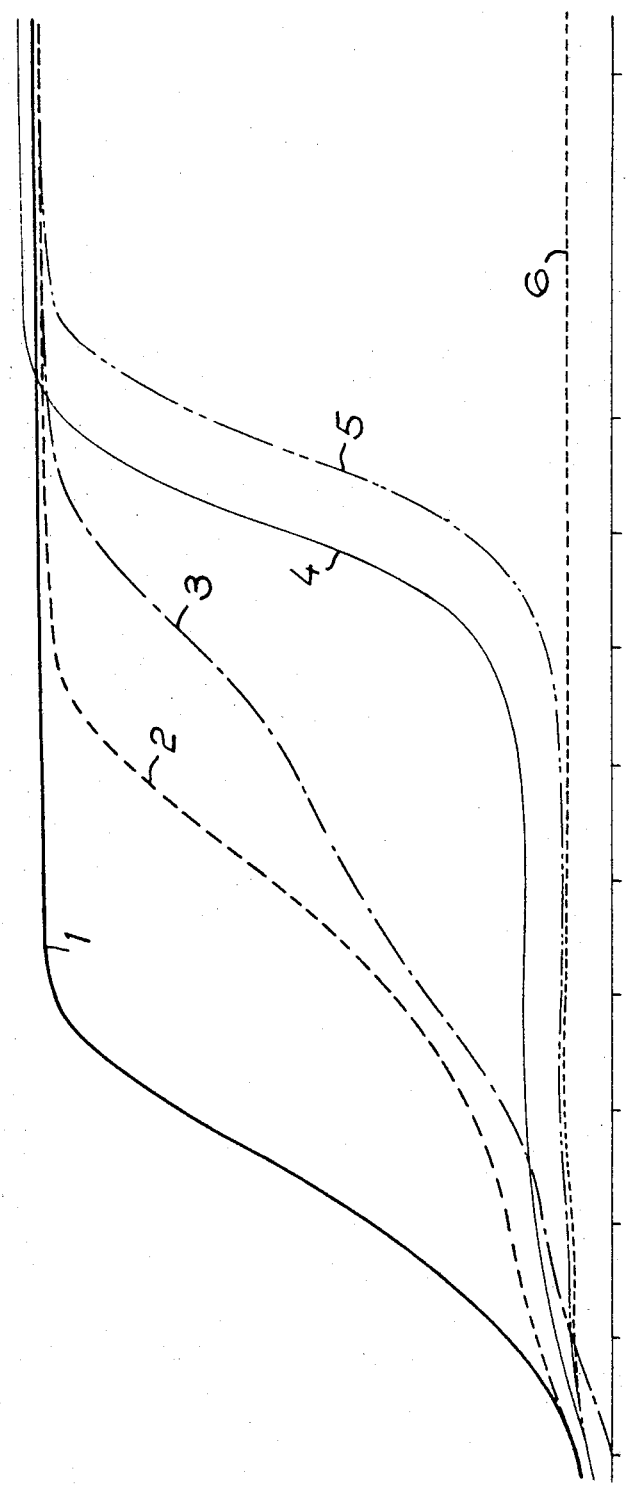
Fig. VI

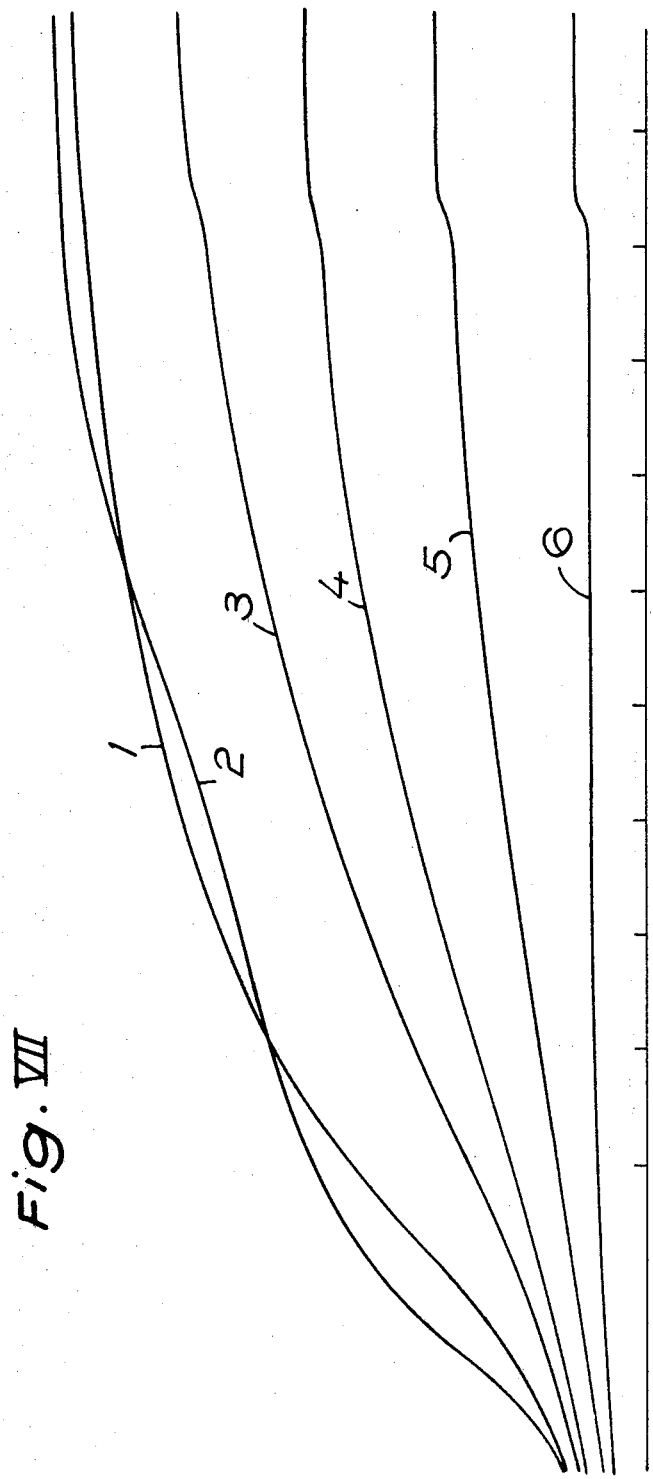
Fig. VII

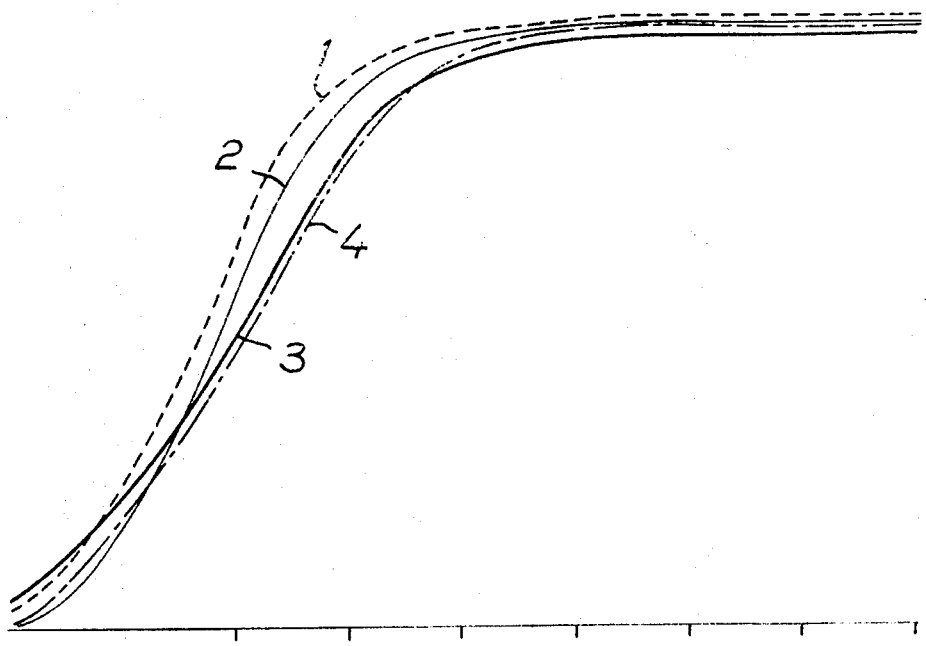
Fig. VIII
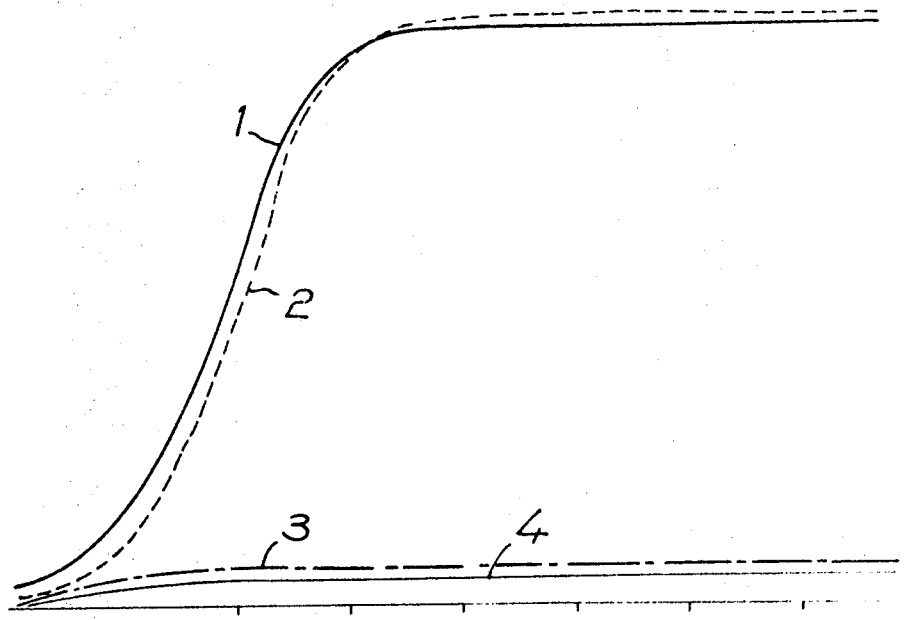
Fig. IX

3,583,973
ANTIBIOTIC SALTS OF EUCALYPTOL SULPHONIC ACIDS
Michel Rolland, Paris, and Raymond Valette, Saulxier par Saulx-les-Chartreux, France, assignors to Les Laboratories Albert Rolland, Paris, France
Filed Apr. 19, 1968, Ser. No. 722,810
Claims priority, application Great Britain, Apr. 21, 1967, 18,556/67
Int. Cl. C07c *129/18;* C07d *7/00*
U.S. Cl. 260—210
6 Claims

ABSTRACT OF THE DISCLOSURE

The invention provides salts of basic antibiotics with eucalyptol mono- or di-sulphonic acid. These new salts have the same utility as the parent antibiotics but markedly reduced toxicity.

---

This invention relates to salts of antibiotics.

In our British specification No. 1,034,487, we have described and claimed eucalyptol sulphonic acids and their salts, especially the sodium salts. The sulphonic acid is obtained by the action of sulphur trioxide on eucalyptol in the presence of dioxane and an inert organic solvent at below 0° C. A mixture of mono- or di-sulphonic acids is obtained, which can be separated by extraction with hot ethanol into a mixture of the sodium salts. The sodium monosulphonate is soluble while the sodium disulphonate is not.

It has now been found that the salts of antibiotics with the aforesaid eucalyptol sulphonic acids have enhanced antibiotic activity coupled with reduced toxicity. Suitable antibiotics are streptomycin, dihydrostreptomycin, framycetin, the tetracycline antibiotics (e.g. tetracycline, chlortetracycline, oxytetracycline), and kanamycin and its analogues.

According to a feature of the invention, the new salts are prepared by double decomposition between the sulphate of the antibiotic base chosen and an alkaline earth metal, especially barium, eucalyptol mono- or di-sulphonate.

The barium mono- or di-sulphonates may be prepared as described in our aforesaid specification, and separated in the same manner as that described for the sodium salts. The solution containing a mixture of barium eucalyptol mono- and di-sulphonates is evaporated to dryness in known manner (for example, by evaporation in vacuo). The powder obtained is extracted with absolute ethanol in which only the monosulphonate is soluble. The product obtained by this treatment has relatively low solubility in water. The soluble monosulphonate is collected by evaporation of the alcohol, dried and then assayed for Ba++ions. The insoluble disulphonate is dried and also assayed for ba++ions.

Barium eucalyptol mono- or di-sulphonate as a fine powder is added with stirring, at ambient temperature, to the antibiotic sulphate solution, and a barium sulphate precipitate gradually appears.

When the test for the Ba++ ion in the solution is negative, the barium sulphate is removed by centrifuging, and the clear liquid is evaporated to dryness under reduced pressure at low temperature. The powders thus obtained are assayed for sulphur and nitrogen.

The antibiotic sulphate and the barium eucalyptol sulphonate are preferably employed in equivalent proportions.

The preparation of the new salts is illustrated in the following examples.

EXAMPLE 1

Dihydrostreptomycin eucalyptol monosulphonate

At laboratory temperature, i.e. about 20° C., 18 g. of dihydrostreptomycin sulphate ($SO_4{}^-$ ion content= 19%) are dissolved in 100 cc. of water, and 20 g. of barium eucalyptol monosulphonate ($Ba^{++}$ ion content= 22.2%) are slowly added with stirring. The dissolution of the latter is scarcely visible, because there is a simultaneous precipitation of barium sulphate. Stirring is continued for half an hour after the end of the addition, and the mixture is then left overnight. The supernatant liquid is tested for $Ba^{++}$ ions. If the test is not negative, dihydrostreptomycin sulphate is added in fractions of 0.5 g. until a negative result is obtained. The mixture is then centrifuged, and the clear liquid is filtered if necessary to obtain completely limipidity.

This filtrate is evaporated in vacuo at 50° C. A vitreous product is obtained which is ground and then treated a number of times with anhydrous diethyl ether, and thoroughly dried over phosphorous pentoxide. The white powder obtained is very soluble in water, $\alpha_D = -50°$ (1% in water).

Its analysis is as follows:

Calculated for $C_{51}H_{93}O_{24}N_7S_3$ (M.W.=1283) (percent): N=7.64; S=7.48. Found (percent): N=7.55; S=7.80.

EXAMPLE 2

Dihydrostreptomycin eucalyptol disulphonate

By the same procedure as in Example 1, 51 g. of dihydrostreptomycin sulphate in solution in 200 cc. of water are treated with 46.6 g. of barium eucalyptol disulphonate. For the powder obtained, $\alpha_D = 54°$ (2% in water).

Analysis of the product gives the following result:

Calculated for $C_{72}H_{129}O_{45}N_{14}S_6$ (M.W.=2101) (percent): N=9.31; S=9.12. Found (percent): N=9.05; S=8.85.

EXAMPLE 3

Framycetin eucalyptol disulphonate

By the procedure described in Example 1, 11 g. of framycetin sulphate in solution in 50 cc. of water are treated with 16.2 g. of barium eucalyptol disulphonate. Analysis of the product, $\alpha_D = +39°$ (1% in water), obtained gives the following results:

Calculated for 2 (base).5 ($C_{10}H_{17}O_7S_2$) (M.W.=about 2764) percent): N=6.07; S=11.60. Found (percent): N=5.92; S=11.30.

If the antibiotics are accessible as the bases rather than their sulphates, they may be suspended in water and converted into the sulphates by the addition of the calculated quantity of normal sulphuric acid. The procedure described above is then followed. An example of this type of procedure is as follows.

EXAMPLE 4

Tetracycline eucalyptol disulphonates 10 g. of tetracycline base are suspended in 250 cc. of water, and 21 cc. of normal sulphuric acid are added with stirring. Stirring is maintained for 2 hours, 5 g. of barium eucalyptol disulphonate in solution in 50 cc. of water are then added. A barium sulphate precipitate appears and the solution turns yellow. After elimination of the precipitate, the filtrate is evaporated in vacuo at 50° C., and the orange powder obtained is treated with anhydrous diethyl ether as in the preceding examples. Analysis of the powder, $\alpha_D = -100°$ (0.1% in methanol), gives the following results:

Calculated for 2 (tetracycline). $(C_{10}H_{17}O_7S_2)$ (M.W.=1201.8) (percent): N=4.65; S=5.33. Found (percent): N=4.5; S=5.16.

EXAMPLE 5

Kanamycin eucalyptol disulphonate

This salt is prepared by the procedure described in Example 1 by the reaction of kanamycin sulphate with barium eucalyptol disulphonate. Its analysis is as follows:

Calculated for 2 kanamycin. 3 eucalyptoldisulphonate. $2H_2O [C_{66}H_{126}O_{33}N_8S_6.2H_2O$, M.W.=1946], N= 5.75; S=9.86. Found (percent): N=5.55; S=10.2.

It has $\alpha_D = +65°$ (1% in water).

The toxicity of the new salts was compared with that of salts of know antibiotics.

The toxicity of dihydrostreptomycin eucalyptol monosulphonate and of kanamycin eucalyptol disulphonate by the subcutaneous route was measured in the mouse, using, batches of 10 mice for each dose.

With 5 g./kg. of dihydrostreptomycin eucalpytol disulphonate, 30% mortality was obtained. Consequently the $LD_{50}$ could not be calculated. By the same route, dihydrostreptomycin itself has an $LD_{50}$ of 1250 mg./kg. (as the sulphate, equivalent to 1,000 mg. of base). The maximum tolerated dose for this new salt is 3250 mg./kg., i.e. 1462 mg./kg. of base; while the maximum tolerated dose for dihydrostreptomycin sulphate is 800 mg./kg., i.e. 640 mg./kg. of base. By the subcutaneous route, the toxicity of the new salt is therefore clearly lower than that of the parent antibiotic.

The $LD_{50}$ of kanamycin eucalyptol disulphonate is between 4080 and 5120 mg./kg., calculated as the base. Kanamycin sulphate has an $LD_{50}$ of between 1900 and 2320 mg./kg., calculated as the base, showing that the new salt has a much reduced toxicity.

The toxicity of dihydrostreptomycin eucalyptol by the intravenous route was measured in the mouse, using batches of 10 mice for each dose. The $LD_{50}$ was 380 mg./kg., i.e. 172 mg./kg. of base. For dihydrostreptomycin sulphate the $LD_{50}$ was 245 mg./kg., i.e. 196 mg./kg. of base. Thus, by the intravenous route, the toxicities of the new salt and of the known salt are very similar to one another.

The toxicity of the new salts as compared with a known salt by the oral route was measured in the mouse, using batches of 10 mice for each dose. The results were as follows: Dihydrostreptomycin sulphate $LD_{50}$=1250 mg./kg.($\equiv$1000 mg./kg. of base). Minimum lethal dose=3250 mg./kg. ($\equiv$1460 mg./kg. of base). Dihydrostreptomycin eucalyptol monosulphonate 30% mortality at 5 g./kg. ($\equiv$2.250 g./kg. of base).

Dihydrostreptomycin eucalyptol disulphonate 10% mortality at 3 g./kg. ($\equiv$1.650 g./kg. of base), 40% mortality at 5 g./kg. ($\equiv$2.750 g./kg. of base). The new salts are therefore not sufficiently toxic for their $LD_{50}$ by the oral route to be assessable.

A comparative study was made of the antibacterial activity of dihydrostreptomycin eucalyptol monosulphonate, which is the compound of Example 1 above, and of dihydrostreptomycin sulphate. The antibacterial activity of both compounds is expressed as streptomycin base. The following media are employed:

(1) Agar for maintaining test microorganisms:

|  | G. |
|---|---|
| Pancreatic peptone | 20 |
| Sodium chloride | 2.50 |
| Glucose | 1 |
| Agar | 20 |
| Water q.s. to 1000 cc. | |

The pH is adjusted to 7.4, and the medium is sterilised for 20 minutes at 110° C.

(2) Liquid nutrient medium:

|  | G. |
|---|---|
| Casein peptone | 5 |
| Yeast extract | 1.120 |
| Meat extract | 1.50 |
| Sodium chloride | 3.50 |
| Glucose | 1 |
| Dipotassium phosphate | 3.68 |
| Monopotassium phosphate | 1.32 |
| Distilled water q.s. to 1000 cc. | |

The pH is adjusted to 7.2, and the medium is sterilised for 30 minutes at 115° C.

The test microorganisms are maintained on agar slants and kept in the refrigerator at +4° C. On the day before the test, agar in a Roux dish is inoculated with a suspension in sterile physiological saline of the microorganism being studied, cultivated on an agar slant. The culture is incubated at 37° C. for 16 to 18 hours. The microorganism cultivated in the Roux dish is suspended in physiological saline and agitating with sterile glass beads. The suspension thus obtained is centrifuged; the microbial residue is washed a number of times and resuspended in the liquid medium so as to obtain an optical density of about 35 on the nephelometer marketed by the firm "Electrosynthese" (using disc 9 of the colourimeter).

The microorganisms studied, the sensitivity curves of which are shown in the accompanying drawings, were:

*Staphylococcus aureus* 209 P (FIG. V);
*E. coli* 548 P (FIG. VI);
*Pseudomonas aeruginosa* A 22 (FIG. VII);
*Proteus vulgaris* A 232 (FIG. VIII); and
*Klebsiella pneumoniae* ATCC 10031 (FIG. IX).

The following additional tests were carried out:

(1) In serial dilutions of antibiotics in liquid media, the medium being inoculated with 0.5% of microbial suspension, and incubated on the water bath at 37° C. for 4 to 6 hours. The results are read on the spectrophotometer equipped for turbidimetry at 6500 A., and the results are shown in the accompanying FIGS. I, II, III and IV.

(2) On the recording biophotometer, the antibiotic concentrations being those found to be active, on the curves of the serial dilutions. The incubation took place for 24 hours at 37° C. with continuous agitation.

In FIGS. V to IX, the abscissae represent the time in hours, and the ordinates the percentages of optical transmission, each curve corresponding to the single concentration hereinafter specified.

In FIGS. I to IV, the abscissae represent the optical transmissions in percent on the spectrophotometer and the ordinates the concentrations of active substance in $\gamma$/ml. In these curves, the continuous lines illustrate the behaviour of the salt of this invention and the hatched lines illustrate that of dihydrostreptomycin sulphate.

In FIGS. V to IX, the numerical designations of the various curves are as follows:

| Figure | Curve | Nature of the active substance | Concentration, grams per ml. |
|---|---|---|---|
| V | 1 | Streptomycin | 1 |
|   | 2 | do | 1.5 |
|   | 3 | Salt of the invention | 1 |
|   | 4 | do | 1.5 |
| VI | 1 | Dihydrostreptomycin | 3 |
|   | 2 | do | 4 |
|   | 3 | Salt of the invention | 3 |
|   | 4 | do | 4 |
|   | 5 | Dihydrostreptomycin | 5 |
|   | 6 | Salt of the invention | 5 |
| VII | 1 | Dihydrostreptomycin | 2 |
|   | 2 | Salt of the invention | 2 |
|   | 3 | do | 3 |
|   | 4 | Dihydrostreptomycin | 3 |
|   | 5 | do | 4 |
|   | 6 | Salt of the invention | 4 |
| VIII | 1 | Streptomycin | 1 |
|   | 2 | Salt of the invention | 1 |
|   | 3 | Streptomycin | 2 |
|   | 4 | Salt of the invention | 2 |
| IX | 1 | Streptomycin | 1.5 |
|   | 2 | do | 2 |
|   | 3 | Salt of the invention | 1.5 |
|   | 4 | do | 2 |

(1) The activity Curves I, II, III and IV relating respectively to *Stephylococcus aureus* 209 P, *Escherichia coil* 548 P, *Proteus vugaris* A 232 and *Klebsiella pneumoniae* are substantially superimposable for the salt of this invention and dihydrostreptomycin sulphate, which shows that the new salt completely retains the activity of the streptomycin base it contains.

(2) The continuously recorded activity curves obtained by employing the active concentrations of antibiotics found by the other methods show that the compound of the invention has greater activity than dihydrostreoptmycin sulphate. More particularly, concentrations of dihydrostreptomycin sulphate which are active on *Stephylococcus aureus*, *Escherichia coli*, *Pseudomonas aeruginosa* and *Klebsiella pneumoniae* are inhibitory with the compound of the invention (see FIGS. V, VI, VII, and IX).

A number of clinical strains of microorganisms were tested. This test was carried out with serial dilutions of the antibiotics on special agar for antibiotics:

| | G. |
|---|---|
| Yeast autolysate | 3 |
| Meat extract | 1.50 |
| Casein peptone | 6 |
| Sodium chloride | 5 |
| Disodium phosphate | 10 |
| Monopotassium phosphate | 0.40 |
| Agar | 15 |

Distilled water q.s. to 1000 ml.

The pH is adjusted to 7.4. After autoclaving for 20 minutes at 120° C., 2 g. of glucose are added and the product is filtered.

The microorganisms, studied in suspension having an optical density of about 35, are spread out in streaks in the Petri dishes with the aid of a calibrated platinum loop. The results obtained are indicated as follows for the various strains studied.

*Staphylococcus aureus* (strain No. 6):
 insensitive to 1000 γ/ml. of dihydrostreptomycin sulphate
 insensitive to 1000 γ/ml. of the compound of the invention.

Colibacillus (strain No. 3):
 insensitive to 1000γ of dihydrostreptomycin sulphate
 sensitive to 500γ of the compound of the invention.
 no culture for 1000γ of the said compound.

Colibacillus (strain No. 5):
 sensitive to 150γ of dihydrostreptomycin sulphate
 sensitive to 100–150γ of the compound of the invention.

Colibacillus (strain No. 9):
 sensitive to 500 to 1000γ of dihydrostreptomycin sulphate
 sensitive to 250–350γ of the compound of the invention.

Paracoli (strain No. 1):
 scarcely sensitive to 1000γ of dihydrostreptomycin sulphate
 sensitive to 250–350γ of the compound of the invention.

Paracoli (strain No. 2);
 insensitive to 1000γ of dihydrostreptomycin sulphate
 insensitive to 1000γ of the compound of the invention.

These results show that, at least in some cases, microorganisms insensitive to a known antibiotic may be sensitive to a salt of that antibiotic in accordance with this invention.

It has been shown experimentally that dihydrostreptomycin eucalyptol disulphonate has an interesting protective effect on the cochlea of the rat as compared with dihydrostreptomycin sulphate used for reference.

The invention accordingly includes within its scope pharmaceutical compositions comprising one or more of the new salts in association with a pharmaceutically acceptable carrier or diluent. Such compositions may be made up in any of the usual forms having regard to the preferred route of administration, dosages to be used and the need for the ingredients to be compatible. In general such compositions will contain 1 to 95% by weight of the new salt.

We claim:
1. A salt of a basic antibiotic selected from the group consisting of streptomycin, dihydrostreptomycin, framycetin, tetracycline, chlorotetracycline, oxytetracycline and kanamycin with an acid selected from the group consisting of eucalyptol-monosulfonic acid and eucalyptol-disulfonic acid.
2. Dihydrostreptomycin eucalyptol monosulphonate.
3. Dihydrostreptomycin eucalyptol disulphonate.
4. Framycetin eucalyptol disulphonate.
5. Tetracycline eucalyptol disulphonate.
6. Kanamycin eucalyptol disulphonate.

References Cited
UNITED STATES PATENTS

| 3,042,581 | 7/1962 | Penau et al. | 260—210AB |
| 3,142,671 | 7/1964 | Kawaguchi et al. | 260—210AB |
| 3,156,617 | 11/1964 | Granatek et al. | 260—210K |
| 3,397,212 | 8/1968 | Valette | 260—345.1 |

LEWIS GOTTS, Primary Examiner

J. R. BROWN, Assistant Examiner

U.S. Cl. X.R.

260—345.1; 424—181